United States Patent
Chung et al.

(10) Patent No.: US 8,626,985 B2
(45) Date of Patent: Jan. 7, 2014

(54) HYBRID OPTICAL DISK DRIVE, METHOD OF OPERATING THE SAME, AND ELECTRONIC SYSTEM ADOPTING THE HYBRID OPTICAL DISK DRIVE

(75) Inventors: Byung-hoon Chung, Seoul (KR); Myung-ryul Choi, Seoul (KR); Yong-bom Jon, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 920 days.

(21) Appl. No.: 12/628,872

(22) Filed: Dec. 1, 2009

(65) Prior Publication Data

US 2010/0142350 A1 Jun. 10, 2010

(30) Foreign Application Priority Data

Dec. 4, 2008 (KR) .................. 10-2008-0122609

(51) Int. Cl.
*G06F 12/00* (2006.01)

(52) U.S. Cl.
USPC .......................................................... 711/103

(58) Field of Classification Search
None
See application file for complete search history.

(56) References Cited

U.S. PATENT DOCUMENTS

| | | | | |
|---|---|---|---|---|
| 5,959,946 A * | 9/1999 | Tognazzini | ..................... | 368/84 |
| 6,070,226 A * | 5/2000 | Freeman et al. | ............... | 711/117 |
| 7,233,890 B2 | 6/2007 | Shapiro et al. | | |
| 7,496,493 B1 * | 2/2009 | Stevens | ........................... | 703/24 |
| 7,630,225 B2 * | 12/2009 | Dunlop et al. | .................. | 365/94 |
| 7,730,270 B2 * | 6/2010 | Dunlop et al. | ................ | 711/161 |
| 7,948,842 B2 * | 5/2011 | Wu et al. | ..................... | 369/44.39 |
| 8,078,794 B2 * | 12/2011 | Lee et al. | ....................... | 711/103 |
| 8,261,040 B2 * | 9/2012 | Kwon et al. | ................... | 711/173 |
| 2006/0152847 A1 * | 7/2006 | Stiles et al. | ................ | 360/97.01 |
| 2008/0101121 A1 | 5/2008 | Kreupl | | |
| 2008/0201522 A1 * | 8/2008 | Wu et al. | ........................ | 711/112 |
| 2008/0297940 A1 * | 12/2008 | Kojima | ........................... | 360/75 |
| 2009/0180248 A1 * | 7/2009 | Roth et al. | ................ | 361/679.33 |
| 2010/0030922 A1 * | 2/2010 | Lee | ................... | 710/10 |
| 2010/0082879 A1 * | 4/2010 | McKean et al. | ................ | 711/103 |
| 2010/0088459 A1 * | 4/2010 | Arya et al. | ..................... | 711/103 |
| 2010/0125741 A1 * | 5/2010 | Rausch et al. | ................ | 713/193 |
| 2010/0329092 A1 * | 12/2010 | Ueno et al. | .................. | 369/47.34 |

FOREIGN PATENT DOCUMENTS

| | | |
|---|---|---|
| KR | 1020030049410 | 6/2003 |
| KR | 10-2004-0090191 A | 10/2004 |
| KR | 1020070033816 | 3/2007 |
| KR | 10-2007-0075442 A | 7/2007 |

OTHER PUBLICATIONS

Korea Office Action issued on Jul. 8, 2013 in counterpart Korean Patent Application No. 10-2008-0122609. (5 pages in Korean).

* cited by examiner

*Primary Examiner* — Hiep Nguyen
(74) *Attorney, Agent, or Firm* — NSIP Law

(57) ABSTRACT

Provided are a hybrid optical disk drive, a method of driving the hybrid optical disk drive, and an electronic system including the hybrid optical disk drive. The hybrid optical disk drive may include an optical disk drive unit for recording/storing data in an optical disk and a solid-state drive (SSD) unit having a storage capacity that is equal to or greater than a maximum storage capacity of the optical disk, which is compatible with the hybrid optical disk drive.

21 Claims, 8 Drawing Sheets

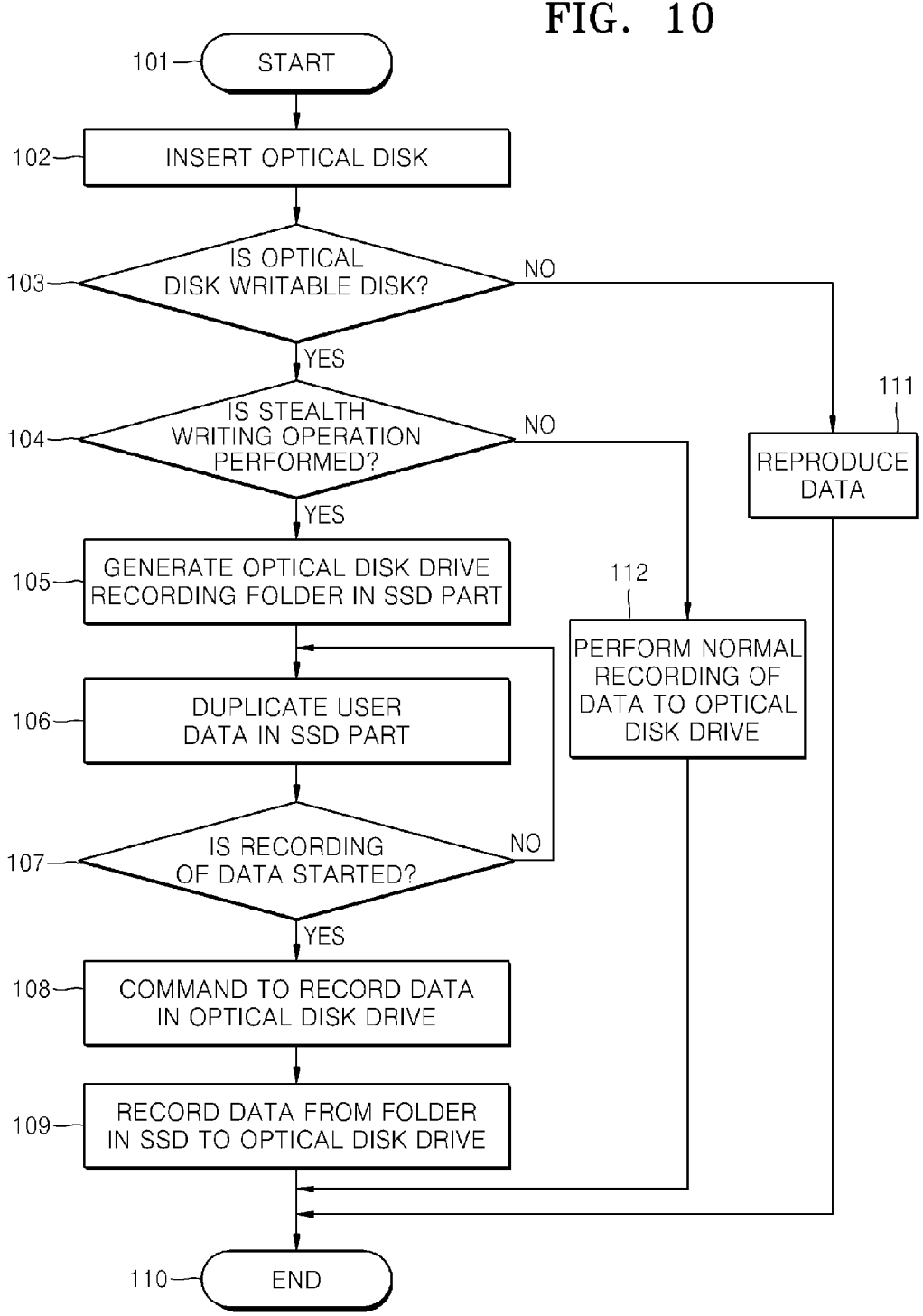

HYBRID OPTICAL DISK DRIVE, METHOD OF OPERATING THE SAME, AND ELECTRONIC SYSTEM ADOPTING THE HYBRID OPTICAL DISK DRIVE

CROSS-REFERENCE TO RELATED PATENT APPLICATION

This application claims the benefit under 35 U.S.C. §119 (a) of a Korean Patent Application No. 10-2008-0122609, filed on Dec. 4, 2008, in the Korean Intellectual Property Office, the entire disclosure of which is incorporated herein by reference for all purposes.

BACKGROUND

1. Field

The following description relates to an optical disk drive, and additionally, to a hybrid optical disk drive having a semiconductor memory device which is usable by a user, a method of driving the hybrid optical disk drive, and an electronic system adopting the hybrid optical disk drive.

2. Description of the Related Art

Optical disk drives are used in portable terminals such as notebook computers, as well as in desktop personal computers (PCs). The notebook computers require a high performance similar to that of desktop PCs while being highly mobile. It may be advantageous to reduce power consumption in the portable terminals and to develop a battery of larger capacity than that of a conventional battery. Recently, solid-state drives (SSDs) using a semiconductor memory have been applied to small and portable terminals. In a small portable terminal, a solid state drive (SSD) may be provided as an emulator which may substitute for a hard disk drive (HDD), and thus, may be connected to the portable terminal via an interface applied to a conventional HDD. The SSD has advantages of a high response speed and low power consumption. However, the SSD has a smaller capacity than that of the HDD.

Even with the development in the SSD field, optical disk drives may be utilized for desktop PCs, as well as notebook computers. Therefore, it may be useful to efficiently apply the SSD and the optical disk drive to electronic systems.

SUMMARY

In one general aspect, there is provided a hybrid optical disk drive comprising an optical disk drive unit for driving an optical disk, a solid-state drive (SSD) unit having a storage capacity that is equal to or greater than a maximum storage capacity of the optical disk, which is compatible with the hybrid optical disk drive, and an interface device for connecting the optical disk drive unit and the SSD unit to an electronic system.

Interfaces of the optical disk drive unit and the SSD unit may have the same standard as each other.

The interface device may include a port multiplier for connecting the interfaces of the optical disk drive unit and the SSD unit to each other.

The interface device may function according to a serial AT attachment (SATA) standard or a universal serial bus (USB) standard.

The hybrid optical disk drive may further include a mirroring unit for duplicating to the SSD unit optical disk data in the optical disk drive unit.

The SSD unit may be an optical disk drive emulator which operates when the optical disk drive unit is accessed.

The hybrid optical disk drive may further include a writing part for buffering data which may be stored in the optical disk of the optical disk drive unit to the SSD unit and writing the data buffered in the SSD unit to the optical disk drive unit.

The hybrid optical disk drive may be adopted by an electronic system.

In the electronic system, the SSD unit of the optical disk drive may be used as a default drive for an operating system. Interfaces of the optical disk drive unit and the SSD unit may have the same standard as each other and the interface device may include a port multiplier for connecting the interfaces of the optical disk drive unit and the SSD unit to each other.

The electronic system may further include a mirroring unit for duplicating to the SSD unit optical disk data in the optical disk drive unit.

In the electronic system, the SSD unit may be an optical disk drive emulator which operates when the optical disk drive unit is accessed.

The electronic system may further include a writing part for buffering data which may be stored in the optical disk of the optical disk drive unit to the SSD unit and writing the data buffered in the SSD unit to the optical disk drive unit.

In another aspect, there is provided a method of driving a hybrid optical disk drive comprising an optical disk drive unit and solid-state drive (SSD) unit to be connected to an electronic system. The method may include duplicating data of an optical disk inserted in the optical disk drive unit to the SSD unit, and reproducing the data duplicated in the SSD unit according to a data reproducing command of the optical disk.

In still another aspect, there is provided a method of driving a hybrid optical disk drive comprising an optical disk drive unit and a solid-state drive (SSD) unit to be connected to an electronic system, wherein recording of data to the optical disk inserted in the hybrid optical disk drive may include buffering data from the electronic system in the SSD unit, and recording the data buffered in the SSD unit to the optical disk drive.

In yet another aspect, there is provided a method of driving a hybrid optical disk drive comprising an optical disk drive unit and a solid-state drive (SSD) unit to be connected to an electronic system, wherein recording of data in the optical disk inserted in the optical disk drive may include duplicating the data from the electronic system to the SSD unit, and recording the data stored in the SSD unit to the optical disk.

In still yet another aspect there is provided a method of driving a hybrid optical disk drive comprising an optical disk drive unit and a solid-state drive (SSD) unit to be connected to an electronic system, wherein recording of data to the optical disk inserted in the hybrid optical disk drive may include buffering data from the electronic system into the SSD unit, and recording the data buffered in the SSD unit to the optical disk.

The recording of the data to the optical disk may further comprise recording the data from the optical disk drive to the optical disk.

A delayed writing part may record the buffered data to the optical disk of the optical disk drive unit at a delayed time.

Other features and aspects will be apparent from the following detailed description, the drawings, and the claims.

BRIEF DESCRIPTION OF THE DRAWINGS

FIG. 10 is a flowchart illustrating another exemplary method of driving a hybrid optical disk drive.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
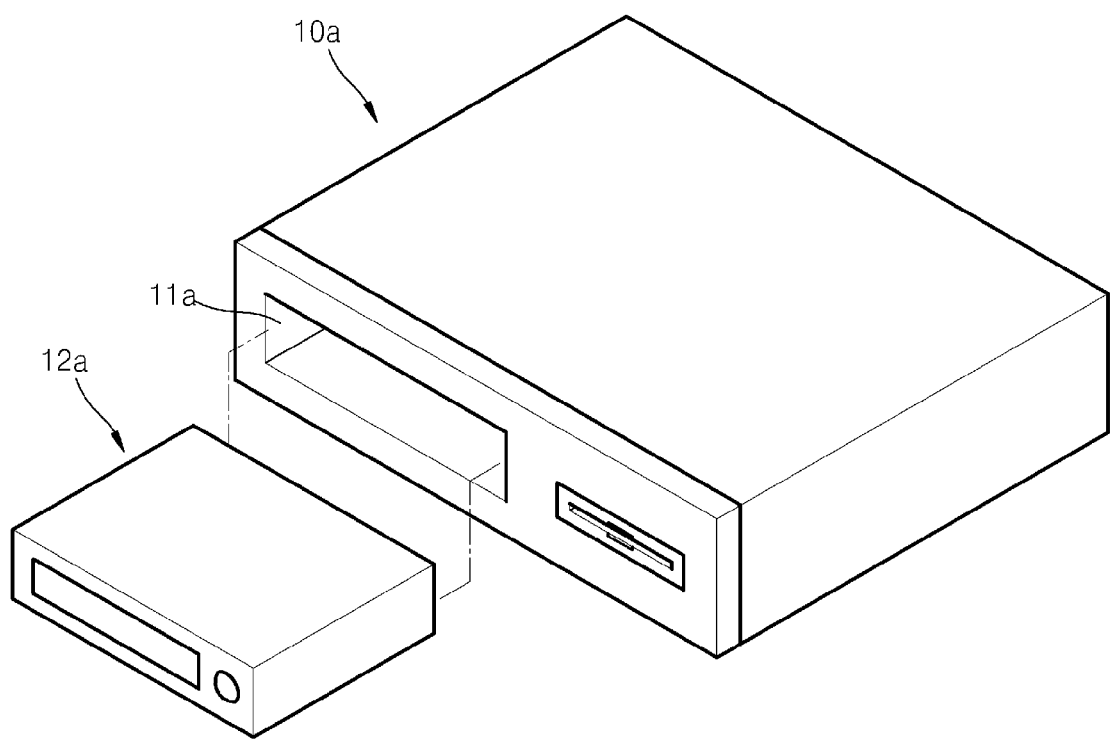
FIG. 1 is a schematic perspective view of a desktop computer as an example of an electronic system including an exemplary hybrid optical disk drive.
Figure 2:
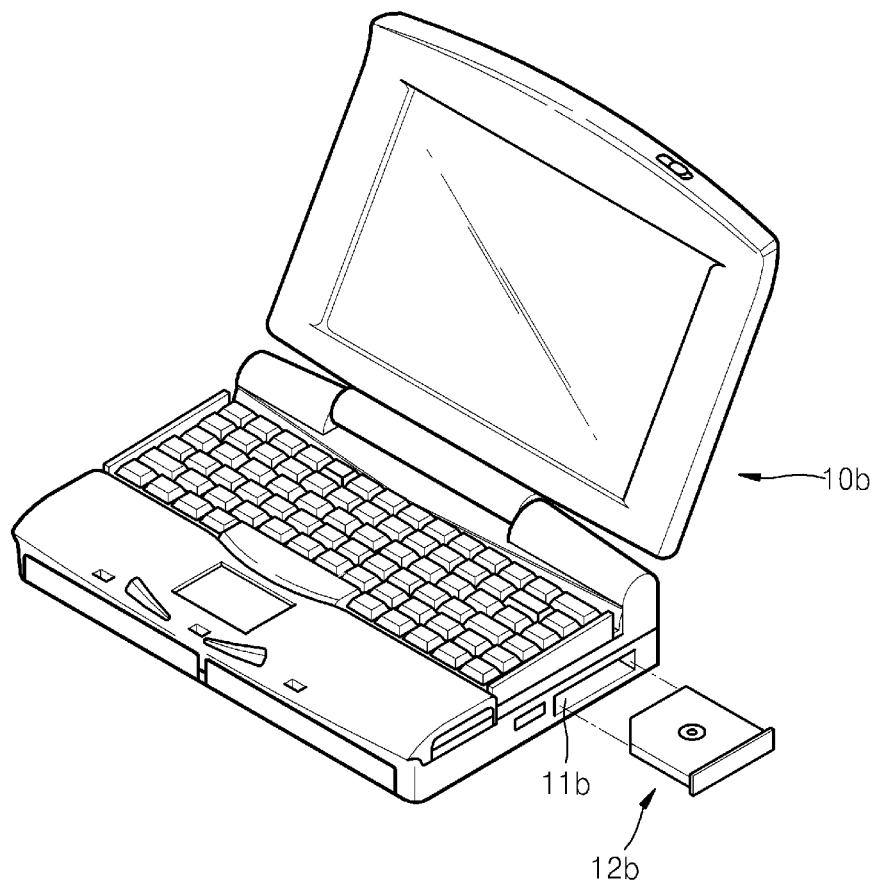
FIG. 2 is a schematic perspective view of a notebook computer as an example of an electronic system including an exemplary hybrid optical disk drive.

FIG. 1 illustrates a desktop computer 10a as an example of an electronic system including an exemplary hybrid optical disk drive 12a. FIG. 2 illustrates a notebook computer 10b as another example of the electronic system including an exemplary hybrid optical disk drive 12b.

As shown in FIGS. 1 and 2, the electronic systems, for example, the desk top computer 10a and the notebook computer 10b, may include drive bays 11a and 11b, respectively, and the hybrid optical disk drives 12a and 12b may be mounted in the drive bays 11a and 11b, respectively.

The optical disk drives 12a and 12b may be connected respectively to the desktop computer 10a and the notebook computer 10b via an interface cable (not shown) for transmitting signals. The interface cable may be a well-known standard cable, for example, an integrated drive electronics (IDE) standard cable, a serial AT attachment (SATA) standard cable, or a universal serial bus (USB) standard cable. However, the interface cable is not limited to these examples.

Figure 3:
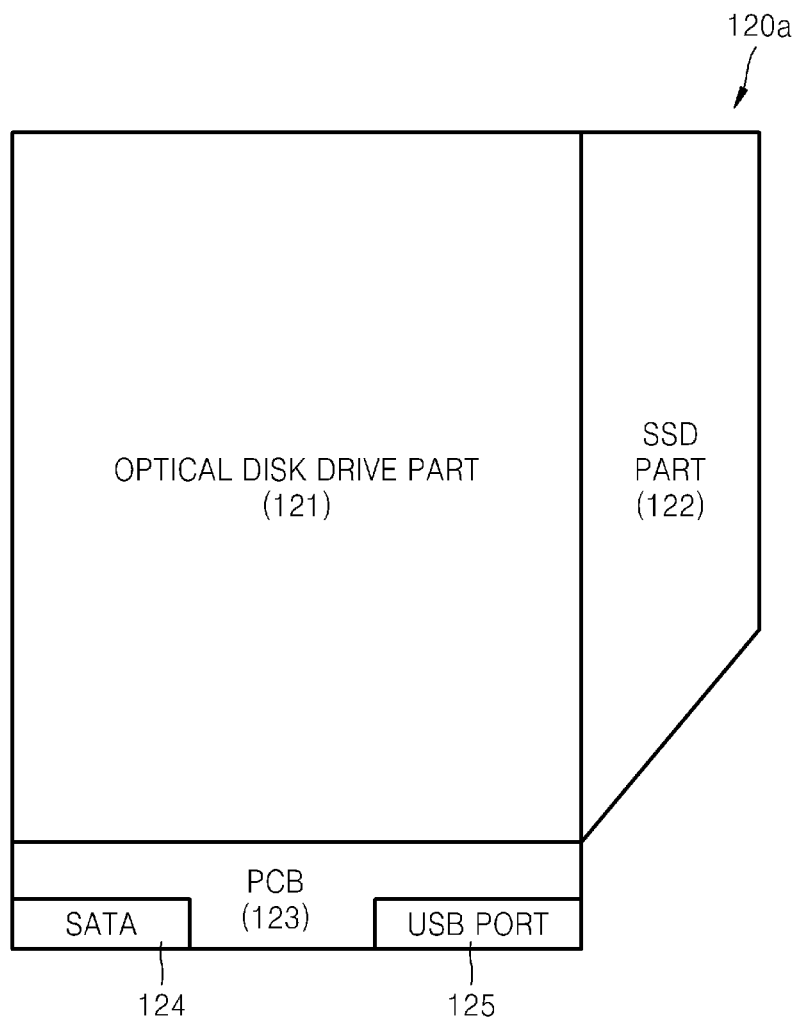
FIG. 3 is a diagram of an exemplary hybrid optical disk drive.

FIG. 3 illustrates the exemplary hybrid optical disk drive 120a. As shown in FIG. 3, the hybrid optical disk drive 120a may include an optical disk drive unit 121 and a solid-state drive (SSD) unit 122. The optical disk drive unit 121 and the SSD unit 122 may be connected to a printed circuit board (PCB) 123. The PCB 123 may include an interface port for connecting to an electronic system such as a computer. For example, the PCB 123 may include a SATA port 124 and a USB port 125. In this case, the SSD unit 122 may be connected to the SATA port 124, and the optical disk drive unit 121 may be connected to the USB port 125. Otherwise, the optical disk drive unit 121 may be connected to the SATA port 124, and the SSD unit 122 may be connected to the USB port 125. The electronic system adopting the hybrid optical disk drive 120a of the present exemplary embodiment may include a SATA port and a USB port corresponding to the SATA port 124 and the USB port 125 of the hybrid optical disk drive 120a.

Figure 4:
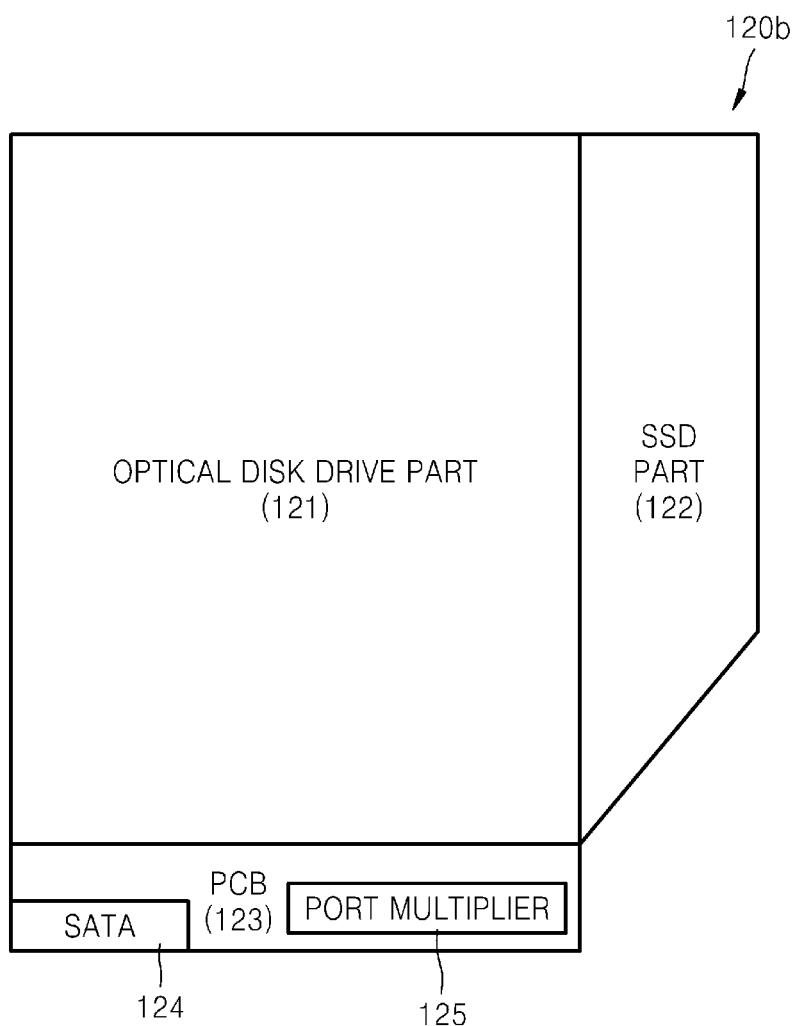
FIG. 4 is a diagram of an exemplary hybrid optical disk drive.

FIG. 4 illustrates another exemplary hybrid optical disk drive 120b. As shown in FIG. 4, the hybrid optical disk drive 120b may include an optical disk drive unit 121 and an SSD unit 122. The optical disk drive unit 121 and the SSD unit 122 may be connected to a PCB 123. The PCB 123 may include an interface port for connecting to an electronic system such as a computer. For example, the PCB 123 may include an interface port such as a SATA port 124 which is shared by the optical disk drive unit 121 and the SSD unit 122, unlike the hybrid optical disk drive 120a of FIG. 3. The optical disk drive unit 121 and the SSD unit 122 may be connected to a SATA port multiplier 125. An interface port multiplier functions as a plurality of SATA devices, for example, the optical disk drive unit 121 and the SSD unit 122, connected to one SATA host port. The interface port multiplier may be compatible to the USB standard. That is, the SATA port 124 may be replaced with a USB port.

The SSD unit 122 may be a hard disk drive emulator which may substitute for a hard disk drive, which is a high speed data reproducing/recording apparatus, such as a general hard disk drive, that may freely write/read information. In the present exemplary embodiment, the SSD unit 122 may use a semiconductor memory device such as a flash memory. However, the technical scope of the present disclosure is not limited by the type or structure of the semiconductor memory device. A minimum capacity of the SSD unit 122 of the present exemplary embodiment may be equal to a maximum capacity of an optical disk which may be used in the optical disk drive unit 121. That is, the SSD unit 122 may have a capacity which may contain all data stored in an optical disk of the optical disk drive unit 121 or greater.

On the other hand, in an operating system such as MICROSOFT WINDOWS®, the C drive may be used as a default drive for the operating system, and thus, the optical disk drive unit 121 and the SSD unit 122 of the present exemplary embodiment may be mapped as the D drive and the E drive, respectively, for example, when the optical disk drive unit 121 and the SSD unit 122 are connected to the computer via the interface cable. In addition, in an electronic system only including an optical disk drive, the SSD unit 122 may be mapped as the C drive.

Figure 5:
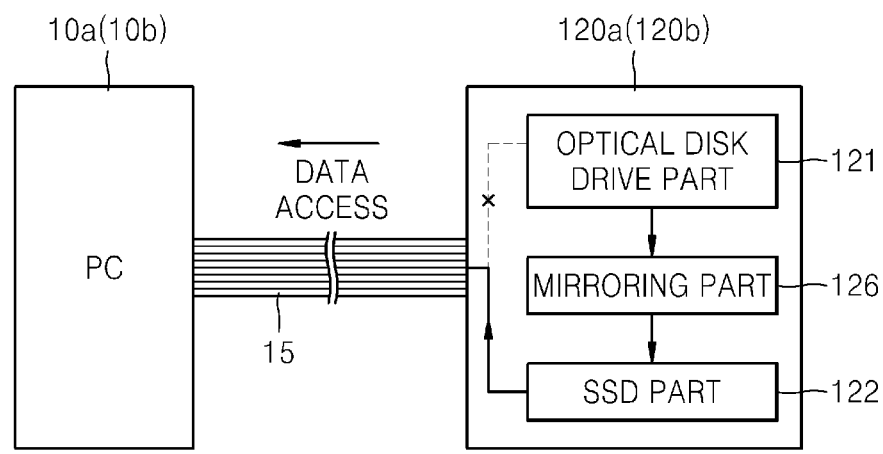
FIG. 5 is a diagram of an exemplary electronic system.

Further, as shown in FIG. 5, the exemplary hybrid optical disk drive 120a or 120b may include a mirroring unit 126 for duplicating to SSD unit 122 information stored in an optical disk which is inserted in the optical disk drive unit 121. When data of the optical disk inserted in the optical disk drive unit 121 is duplicated to the SSD unit 122 by the mirroring unit 126, the electronic system such as the desktop or notebook computer 10a or 10b, which accesses the data via an interface cable 15, may read the data from the SSD unit 122. That is, according to an exemplary embodiment, the electronic system does not directly access the data of the optical disk via the optical disk drive unit 121, but accesses the data of the optical disk via the SSD unit 122 on which the optical disk data is duplicated. Thus, the optical disk drive unit 121, which may have relatively higher power consumption than that of the SSD unit 122 and a slower accessing speed than that of the SSD unit 122, is not used, and the SSD unit 122 having lower power consumption and a faster accessing speed than those of the optical disk drive unit 121, is used, thereby, reducing the data processing time. The above performance may be realized due to the SSD unit 122 functioning as an optical disk drive emulator. In a state where the duplicate of the data is made as described above, when a command to access the optical disk drive unit 121 is generated by an application program in the electronic system such as the desktop or notebook computer 10a or 10b, the SSD unit 122 may actually be accessed instead. Accordingly, power consumption may be reduced, and thus, the hybrid optical disk drive 120a or 120b may be suitable for portable electronic systems such as mini-notebook computers and ultra-mini personal computers (UMPCs). In addition, since the SSD unit 122 having a higher accessing speed than that of the optical disk drive unit 121 may be used, the hybrid optical disk drive 120a or 120b may be suitable for all kinds of devices requiring high speed data process.

The mirroring unit 126 may be installed in the hybrid optical disk drive 120a or 120b. According to another exemplary embodiment, the mirroring unit 126 may be installed in the electronic system such as the desktop or notebook computer 10a or 10b so that the mirroring function may be performed remotely. The above mirroring unit 126 may be implemented as software in a read only memory (RAM) of the electronic system and as firmware such as a custom integrated circuit (IC) included in the hybrid optical disk drive 120a or 120b. However, embodiments are not limited to the above examples.

Figure 6:
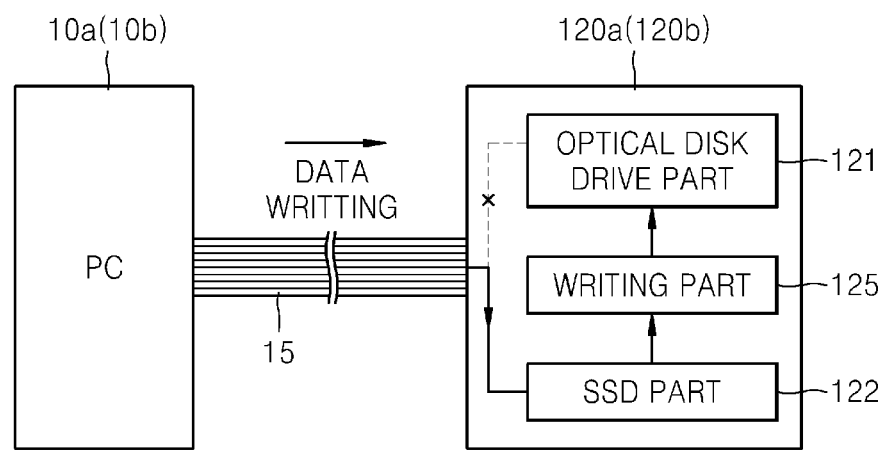
FIG. 6 is a diagram of another exemplary electronic system.

Referring to FIG. 6, a command for writing data to the optical disk drive unit 121 may be generated. The data may be duplicated to the SSD unit 122 first, and then, the duplicated data may be recorded indirectly into the optical disk of the optical disk drive unit 121 via a delayed writing part 125. That is, the SSD unit 122 may operate as a buffer of the data to be recorded in the optical disk, and after buffering the data, the data may be transmitted to the optical disk drive unit 121 by the delayed writing part 125. The above operation of the delayed writing part 125 is similar to that of the mirroring unit 126 described with reference to FIG. 5. The above writing operation using the buffering of the SSD unit 122 may be performed rapidly due to the high accessing speed of the SSD unit 122, and the buffered data may be recorded in the optical disk by the delayed writing part 125 that internally operates. Therefore, when a user selects to record the data in the optical disk, the data may be buffered into the SSD unit 122 at a high speed so that the user may rapidly process other operations, and the delayed writing part 125 records the buffered data in the optical disk of the optical disk drive unit 121 at an appropriately delayed time regardless of the operations performed by the user. The recording of the data by the delayed writing part 125 may be performed automatically and confidentially to the user when a load applied to the electronic system is small or the electronic system is not used.

The mirroring unit 126 and the delayed writing part 125 may be the same as each other in view of buffering the access data or the writing data to the SSD unit 122 except for directions in which the data flows. Therefore, functions of the mirroring unit 126 and the delayed writing part 125 may be realized by an integrated data processing circuit.

Figure 7:
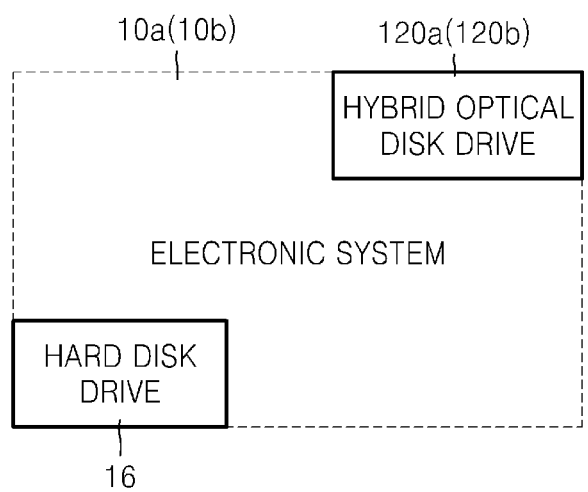
FIG. 7 is a diagram of another exemplary electronic system.

FIG. 7 illustrates the desktop or notebook computer 10a or 10b in which the exemplary hybrid optical disk drive 120a or 120b is mounted. The electronic system 10a or 10b may include a built-in hard disk drive 16 as a default disk drive. The electronic system 10a or 10b may include the hybrid optical disk drive 120a or 120b, and the SSD unit 122 of the hybrid optical disk drive 120a or 120b may function as the optical disk drive emulator or the buffer for writing data. On the other hand, according to another exemplary embodiment, when the SSD unit 122 is not used as the optical disk drive emulator or the buffer for writing data, the SSD unit 122 may perform as an external storage device which may support the hard disk drive 16. The above function of the external storage device may be effective in a portable electronic system such as the notebook computer which may not include an additional storage device due to a limitation in an internal area. The SSD unit 122 may be installed in an empty space of the optical disk drive so that a data storage capacity of the portable electronic system may be increased.

Figure 8:
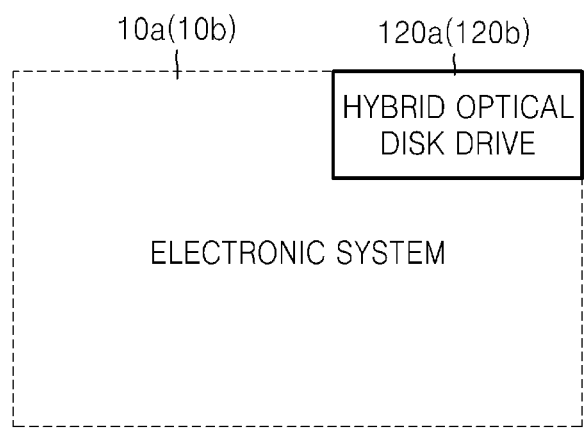
FIG. 8 is a diagram of another exemplary electronic system.

On the other hand, referring to FIG. 8, the electronic system may not include an internal storage device of its own. When the electronic system does not include the internal data storage device such as a hard disk drive, the size of the electronic system may be less than when the internal data storage device is included. Instead, the SSD unit 122 may be installed in the optical disk drive, the size of which is large due to the internal space being occupied by the optical disk, and the SSD unit 122 may be used as a default drive for the operating system of the electronic system. The SSD unit 122 of the hybrid optical disk drive 120a or 120b may not be used as the optical disk drive emulator or the buffer for the delayed data writing operation. However, even when the SSD unit 122 is used as the default drive for the operating system, the SSD unit 122 may also be used as the optical disk drive emulator or the buffer for writing the data.

Figure 9:
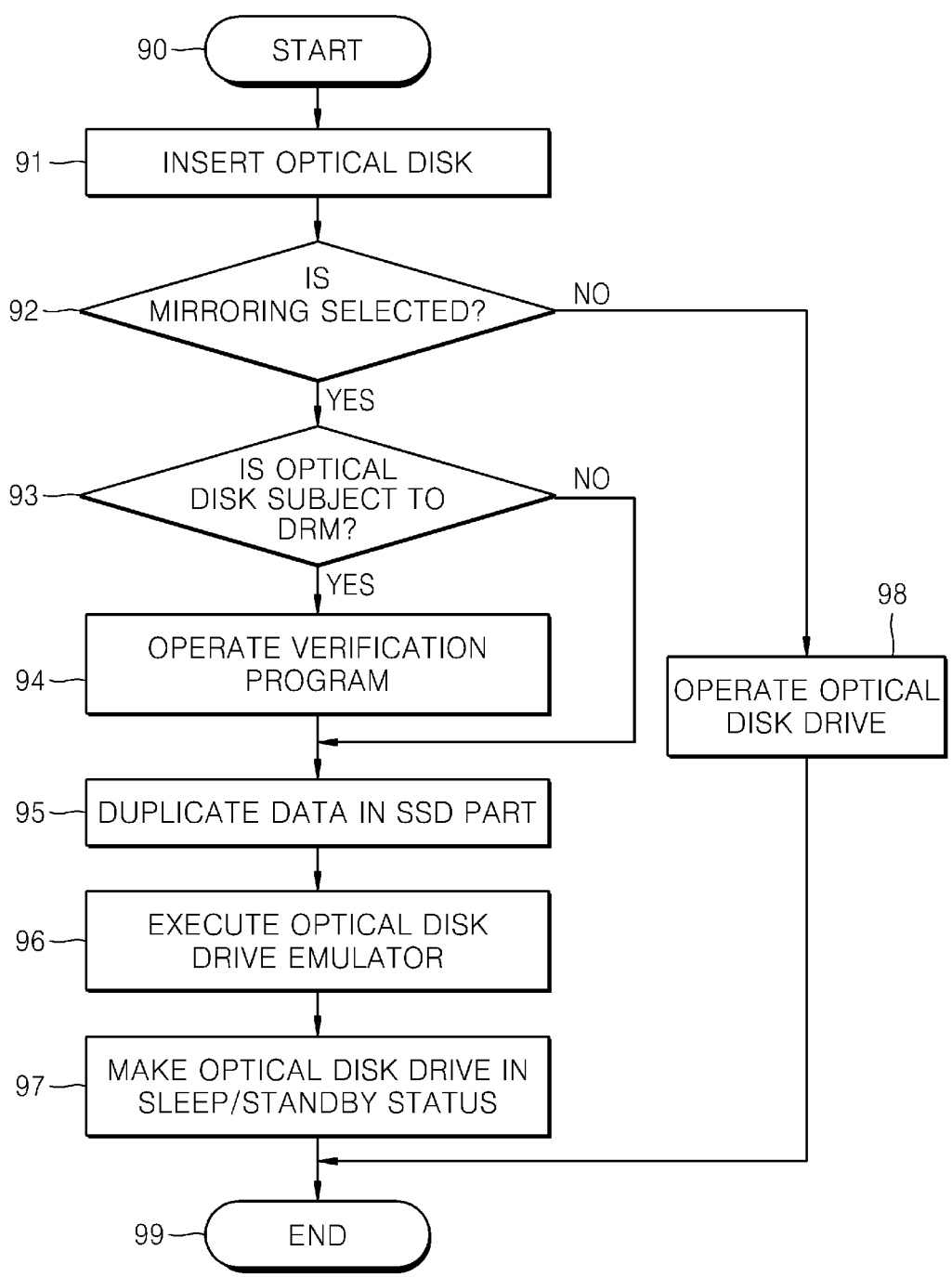
FIG. 9 is a flowchart illustrating an exemplary method of driving a hybrid optical disk drive.

FIG. 9 is a flowchart illustrating an exemplary method of driving a hybrid optical disk drive 120a or 120b when the SSD unit 122 is used as the optical disk drive emulator.

After starting the electronic system including the hybrid optical disk drive 120a or 120b in 90, an optical disk is inserted into the optical disk drive unit 121 in 91. The electronic system or the hybrid optical disk drive determines whether a mirroring operation is selected or not. If the mirroring operation is not selected, the optical disk drive unit 121 may operate as a general optical disk drive in 98.

Otherwise, if the mirroring operation is selected, it may be identified whether the optical disk in the optical disk drive unit 121 is a subject to digital rights management (DRM) in 93. If the optical disk is subject to DRM, a verification program is executed to perform the verification of the optical disk in 94, and if the optical disk is not subject to DRM, the process goes to 95. In 95, the duplication of the optical disk may be performed, and in 96, the SSD unit 122 may be operated as the optical disk drive emulator. In addition, the optical disk drive unit 121 may be in a sleep or standby status to reduce power consumption, or the operation of the optical disk drive unit 121 may be stopped in 97.

FIG. 10 is a flowchart illustrating another exemplary method of driving the hybrid optical disk drive 120a or 120b when an SSD unit 122 is used as the delayed writing buffer of data that will be recorded to an optical disk of an optical disk drive unit 121.

In 101, the electronic system starts to operate, and an optical disk is inserted into the optical disk drive unit 121 in 102. When the optical disk is inserted, it may be determined whether the optical disk is a writable disk by reading physical data from the optical disk in 103. If it is determined that the optical disk is not a writable disk, the optical disk is a read-only disk, and an auto-run of the optical disk is executed according to the settings of the operating system in 111. Otherwise, if it is determined that the optical disk is a writable disk in 103, it may be determined whether a delayed writing operation or a stealth (background) writing operation, 104, is set in the electronic system or in the hybrid optical disk drive. If the delayed writing operation or the stealth writing operation is not set, the optical disk may be set to a direct recording status like in a normal writing mode of data in 110. Otherwise if the delayed writing operation or the stealth writing operation is set, 105, the data to be recorded may be duplicated in the SSD unit 122 which operates as a buffer in 106. Here, the data duplicated in the SSD unit 122 may be duplicated before inserting the optical disk into the optical disk drive unit 121. That is, 106 may be performed before inserting the optical disk in the optical disk drive unit 121. After finishing the duplication of data, it may be determined whether the data will be recorded to the optical disk drive unit 121 or not in 107. The determination of a data writing operation may be executed at a time set by an operation of a button included in the hybrid optical disk drive, or by the software or firmware. Regarding the determining of the data writing operation, a writing command may be transmitted to the optical disk drive unit 121 in 108, and the data buffered in the SSD unit 122 may be transferred to the optical disk drive unit 121 to be recorded to the optical disk in 109. The delayed writing or the stealth writing operation utilizes the SSD unit 122, the storage capacity of which corresponds to that of the optical disk.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or an electronic system may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or electronic system is a mobile apparatus, a battery may be additionally provided to supply operation voltage of the computing system or electronic system.

It will be apparent to those of ordinary skill in the art that the computing system or electronic system may further include an application chipset, a camera image processor (CIS), a mobile Dynamic Random Access Memory (DRAM), and the like. The memory controller and the flash memory device may constitute a solid state device/drive/disk that uses a non-volatile memory to store data.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid optical disk drive comprising:
an optical disk drive unit for driving an optical disk;
a solid-state drive (SSD) unit having a storage capacity that is equal to or greater than a maximum storage capacity of the optical disk, and which is compatible with the hybrid optical disk drive;
an interface device for connecting the optical disk drive unit and the SSD unit to an electronic system; and
at least one of a mirroring unit configured to duplicate to the SSD unit optical disk data in the optical disk drive unit or a writing art configured to buffer data which will be stored in the optical disk to the SSD unit.

2. The hybrid optical disk drive of claim 1, wherein interfaces of the optical disk drive unit and the SSD unit have the same standard as each other.

3. The hybrid optical disk drive of claim 2, wherein the interface device includes a port multiplier configured to connect the interfaces of the optical disk drive unit and the SSD unit to each other.

4. The hybrid optical disk drive of claim 3, wherein the interface device functions according to a serial AT attachment (SATA) standard or a universal serial bus (USB) standard.

5. The hybrid optical disk drive of claim 1, wherein the at least one of the mirroring unit or the writing part is the mirroring unit, and the mirroring unit is configured to duplicate to the SSD unit optical disk data in the optical disk drive unit.

6. The hybrid optical disk drive of claim 4, wherein the SSD unit is an optical disk drive emulator which operates when the optical disk drive unit is accessed.

7. The hybrid optical disk drive of claim 1, wherein the at least one of the mirroring unit or the writing part is the writing part, and the writing part is configured to buffer data which will be stored in the optical disk of the optical disk drive unit to the SSD unit and writing the data buffered in the SSD unit to the optical disk drive unit.

8. An electronic system comprising the hybrid optical disk drive according to claim 1.

9. The electronic system of claim 8, wherein the SSD unit of the hybrid optical disk drive is used as a default drive for an operating system.

10. The electronic system of claim 8, wherein interfaces of the optical disk drive unit and the SSD unit have the same standard as each other.

11. The electronic system of claim 10, wherein the interface device includes a port multiplier configured to connect the interfaces of the optical disk drive unit and the SSD unit to each other.

12. The electronic system of claim 8, wherein the at least one of the mirroring unit or the writing part is the mirroring unit, and the mirroring unit is configured to duplicate to the SSD unit optical disk data in the optical disk drive unit.

13. The electronic system of claim 12, wherein the SSD unit is an optical disk drive emulator which operates when the optical disk drive unit is accessed.

14. The electronic system of claim 8, wherein the at least one of the mirroring unit or the writing part is the writing part, and the writing part is configured to buffer data which will be stored in the optical disk of the optical disk drive unit to the SSD unit and writing the data buffered in the SSD unit to the optical disk drive unit.

15. A method of driving a hybrid optical disk drive comprising an optical disk drive unit and a solid-state drive (SSD) unit to be connected to an electronic system, the method comprising:
    duplicating data of an optical disk inserted in the optical disk drive unit to the SSD unit; and
    reproducing the data duplicated in the SSD unit according to a data reproducing command of the optical disk.

16. The method of driving a hybrid optical disk drive of claim 15, further comprising:
    substituting a general hard disk drive with the hybrid optical disk drive, wherein the SSD unit is configured to act as a hard disk drive emulator.

17. A method of driving a hybrid optical disk drive comprising an optical disk drive unit and a solid-state drive (SSD) unit to be connected to an electronic system, the method comprising:
    duplicating the data from the electronic system to the SSD unit; and
    recording the data stored in the SSD unit to an optical disk inserted in the optical disk drive unit.

18. A method of driving a hybrid optical disk drive comprising an optical disk drive unit and a solid-state drive (SSD) unit to be connected to an electronic system, the method comprising:
    buffering data from the electronic system in the SSD unit; and
    recording the data buffered in the SSD unit to the optical disk drive unit.

19. The method of driving a hybrid optical disk drive of claim 18, wherein the method further comprises recording the data to an optical disk inserted in the optical disk drive unit.

20. The method of driving a hybrid optical disk drive of claim 19, wherein a delayed writing part records the buffered data to the optical disk at a delayed time.

21. A hybrid optical disk drive comprising:
    an optical disk drive unit;
    a solid-state drive (SSD) unit; and
    an interface device for connecting the optical disk drive unit and the SSD unit to an electronic system,
    wherein the SSD unit is an optical disk drive emulator which operates when the optical disk drive unit is accessed.

* * * * *